United States Patent
Norefors et al.

(10) Patent No.: US 6,370,380 B1
(45) Date of Patent: Apr. 9, 2002

(54) METHOD FOR SECURE HANDOVER

(75) Inventors: Arne Norefors, Stockholm; Yi Cheng, Solna; Lorens Almehag, Stockholm; Karl Dan Gustav Jerrestam, Johanneshov, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/251,396

(22) Filed: Feb. 17, 1999

(51) Int. Cl.$^7$ ................................................. H04M 1/66
(52) U.S. Cl. ........................ 455/436; 455/411; 370/331; 380/247; 380/248
(58) Field of Search ................................ 455/411, 436, 455/437, 438, 439, 440, 441, 442, 443, 444, 450, 451, 452; 370/331, 332, 333, 334; 380/247, 248; 713/156

(56) References Cited

U.S. PATENT DOCUMENTS

| | | | | |
|---|---|---|---|---|
| 5,091,942 A | * | 2/1992 | Dent | 380/46 |
| 5,598,459 A | | 1/1997 | Haartsen | 379/58 |
| 5,943,615 A | * | 8/1999 | Rose et al. | 455/411 |
| 6,026,293 A | * | 2/2000 | Osborn | 455/411 |
| 6,137,791 A | * | 10/2000 | Frid et al. | 370/352 |

FOREIGN PATENT DOCUMENTS

WO    WO92/021203    2/1992 ............... 455/411

* cited by examiner

Primary Examiner—Thanh Cong Le
Assistant Examiner—Tuan Tran
(74) Attorney, Agent, or Firm—Burns, Doane, Swecker & Mathis, L.L.P.

(57) ABSTRACT

In a mobile, wireless telecommunications network, communications relating to a mobile terminal can be protected during a handover of the mobile terminal from a first access point to a second access point. This may be accomplished by transmitting a security token from the first access point to the mobile terminal, and then from the mobile terminal to the second access point, over the radio interface. Thereafter, the security token is transmitted from the first access point to the second access point through the fixed network to which both the first and the second access points are connected. The communications link between the mobile terminal and the second access point needed to achieve secure handover is then established only if the second access point determines that the security token received from the mobile terminal matches the security token received from the first access point.

26 Claims, 5 Drawing Sheets

METHOD FOR SECURE HANDOVER

FIELD OF THE INVENTION

The present invention relates to the field of telecommunications. More particularly, the present invention relates to the field of wireless, mobile telecommunications.

BACKGROUND

FIG. 1 illustrates an exemplary wireless network 100, such as a wireless local area network. As shown, the wireless network 100 includes a fixed network portion 105, wherein fixed network portion 105 typically includes transmission equipment that communicates with various systems (not shown) that are external to the wireless network 100, such as a publically switched telephone network and/or the Internet. The fixed network portion 105 is further connected to a number of fixed radio stations known as base stations or access points, for example, access points $AP_1$ and $AP_2$. Each of the access points, in turn, are capable of communicating with one or more mobile terminals, such as mobile terminal MT, over a radio (i.e., a wireless) interface.

Further with regard to FIG. 1, each of the access points, AP1 and AP2 primarily communicates with a mobile terminal in a corresponding cell C1 and C2 respectively. Moreover, it will be understood that a mobile terminal MT, communicating through an access point AP1 is generally located within the cell C1 corresponding to the access point AP1. However, as the mobile terminal MT moves away from access point AP1, as indicated by the arrow 110, toward another access point, for example AP2 and its corresponding cell C2, the signal quality associated with the communication link between the mobile terminal MT and the access point AP1 tends to decrease. If the mobile terminal MT continues to move away from the access point AP1, and the signal quality associated with the communication link between the mobile terminal MT and the access point AP1 continues to deteriorate, the communications link will, in all likelihood, be lost if the connection is not passed off or transferred from the access point AP1 to another access point, such as, access point AP2. The process of passing off or transferring the connection from AP1 to AP2 is known as handover or, alternatively, handoff.

During handover, the commnunications link associated with a mobile terminal is highly susceptible to intruders, that is, entities that wish to hijack or simply disrupt the communications link. For instance, an intruding device can, during a handover, present itself to the new access point (i.e., the access point to which the mobile terminal is attempting to establish a communications link). If the new access point accepts the intruding device as the mobile terminal, the access point may begin transmitting information to the intruder that is intended for the mobile terminal.

Although providing security for communications between a mobile terminal and one or more access points at all times is an important concern, providing a method and/or system that does so particularly during handover would be highly desirable.

SUMMARY

The present invention is of particular relevance to mobile telecommunications networks, wherein mobile terminals undergo handover from one radio station (i.e., access point) to another as they move from one cell to another within the telecommunications network. More particularly, the present invention involves protecting communications associated with a mobile terminal against unauthorized intrusion when the mobile terminal undergoes a handover from one access point to another.

In accordance with one aspect of the present invention, a method and/or a telecommunications network is provided for achieving secure handover of a mobile terminal from a first access point to a second access point, wherein the first access point and the second access point are physically connected through a fixed network. The method and/or network involves transmitting a security token from the first access point to the mobile terminal, and then from the mobile terminal to the second access point over a radio interface. The security token is then transmitted from the first access point to the second access point through the fixed network. A communication link is then established between the mobile terminal and the second access point, to achieve secure handover, if the second access point determines that the security token received from the mobile terminal matches the security token received from the first access point.

In accordance with another aspect of the present invention a method and/or a telecommunications network is provided for achieving secure handover of a mobile terminal from a first access point to a second access point. The method and/or network involves transmitting a first message from the first access point to the mobile terminal over a radio interface, the first message containing an encrypted security token and a hash code. Then, in the mobile terminal, the encrypted security token is deciphered using an encryption key that is shared by the mobile terminal and the first access point. The mobile terminal then re-encrypts the security token using an encryption key that it shares with the second access point. Thereafter, a message is transmitted from the mobile terminal to the second access point, this second message containing the re-encrypted security token and the hash code. The second access point then deciphers the re-encrypted security token using the encryption key that it shares with mobile terminal. Finally, a communications link is established between the mobile terminal and the second access point, to achieve secure handover, if the second access point authenticates the mobile terminal based on the deciphered security token and the hash code.

BRIEF DESCRIPTION OF THE DRAWINGS

The objects and advantages of the invention will be understood by reading the following detailed description in conjunction with the drawings in which.

DETAILED DESCRIPTION

Figure 1:
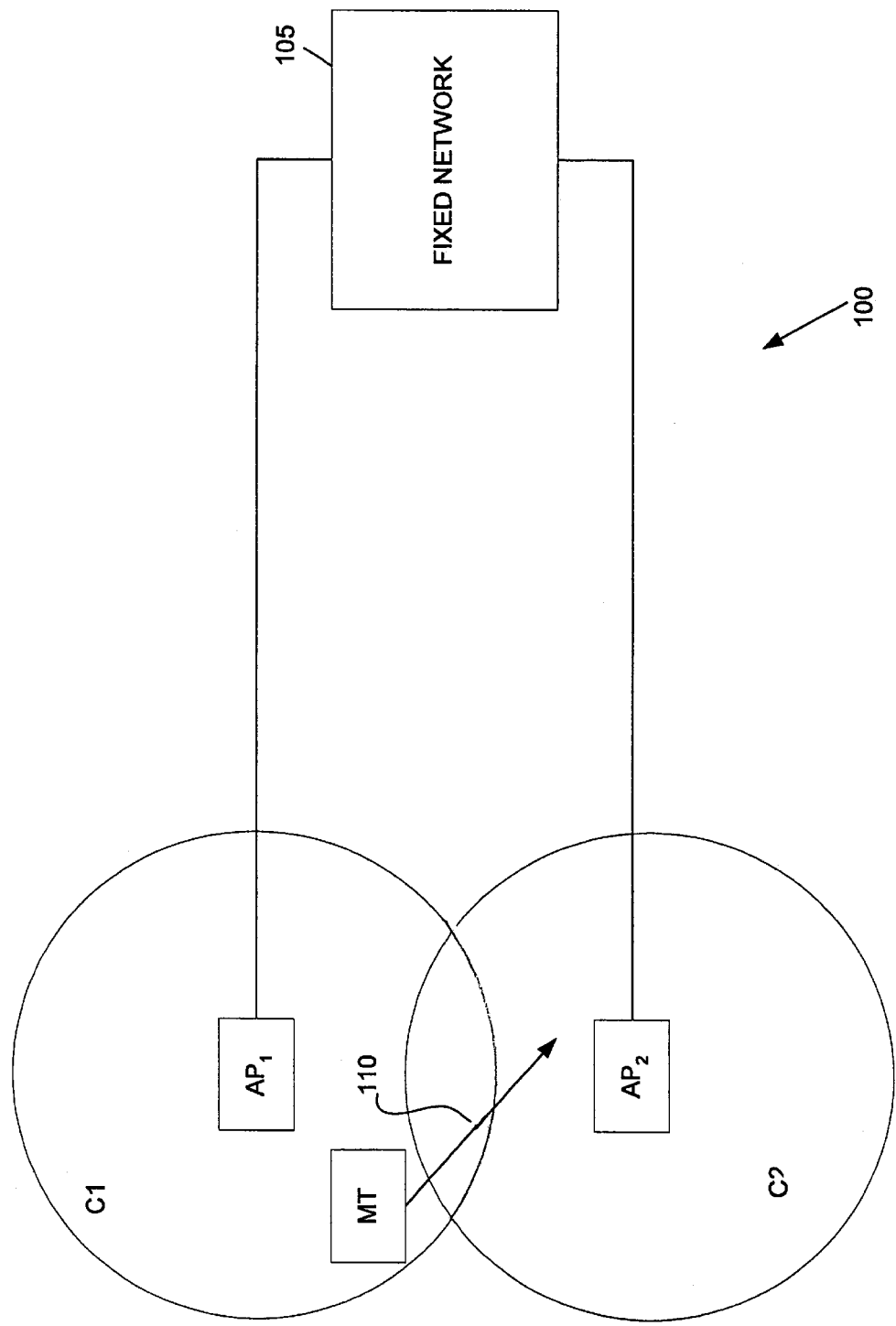
FIG. 1 illustrates an exemplary mobile, wireless telecommunications network.
Figure 2:
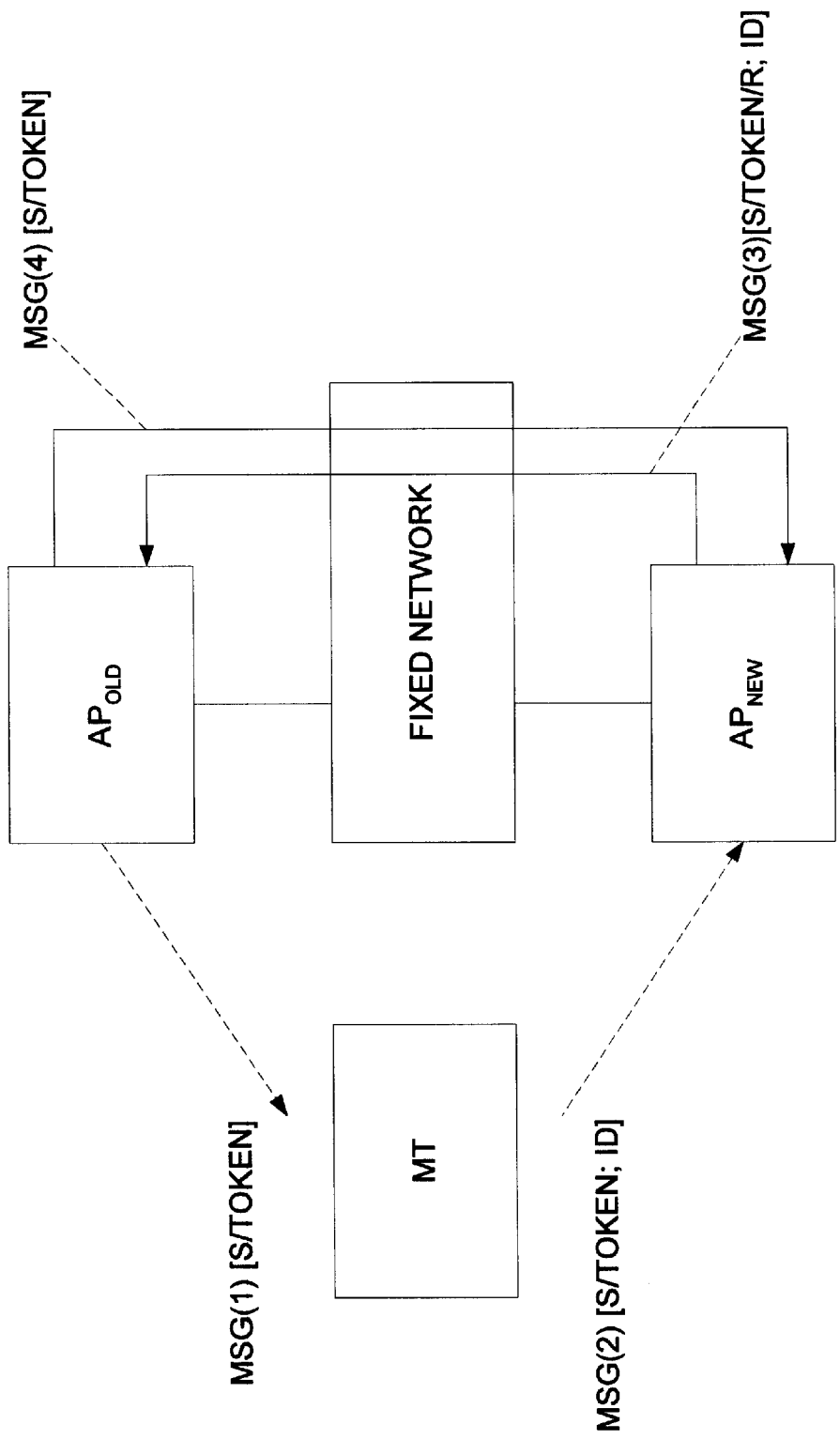
FIG. 2 illustrates a first embodiment of the present invention.

FIG. 2 illustrates a technique for securing communications for a mobile terminal MT during a handover procedure from a first access point (e.g., $AP_{OLD}$) to a second access point (e.g., $AP_{NEW}$), in accordance with a first exemplary embodiment of the present invention. As shown in FIG. 2, $AP_{OLD}$ sends the mobile terminal MT, before the communications link between the mobile terminal MT and $AP_{OLD}$ is disconnected, a message (1) containing a security token (S/TOKEN). In this first exemplary embodiment, the security token may be any sequence of characters, such as a random number sequence. Then, prior to the establishment of a communications link between the mobile terminal MT and $AP_{NEW}$, the mobile terminal MT transmits a message (2) to $AP_{NEW}$, wherein the message (2) contains the security token provided by $AP_{OLD}$, and one or more mobile identity codes. Upon receiving the message (2) from the mobile terminal MT, $AP_{NEW}$ sends a message (3) to $AP_{OLD}$ via the fixed network. This message (3) contains a security token request (S/TOKEN/R) as well as one or more of the mobile identity codes provided by the mobile terminal MT. In response, $AP_{OLD}$ transmits to $AP_{NEW}$, a message (4), which contains the security token that $AP_{OLD}$ also provided to the mobile terminal MT in the message (1).

Further in accordance with the first exemplary embodiment of the present invention, $AP_{NEW}$ now attempts to authenticate the mobile terminal MT. The $AP_{NEW}$ accomplishes this by comparing the security token it received from the mobile terminal MT in the message (2) with the security token it received from $AP_{OLD}$ in the message (4). If $AP_{NEW}$ determines that the security token it received from the mobile terminal MT matches the security token it received from $AP_{OLD}$, $AP_{NEW}$ authenticates the mobile terminal MT, thereby allowing a communications link to be established between the mobile terminal MT and $AP_{NEW}$.

Alternatively, $AP_{OLD}$ may store a timestamp associated with the instant of time it transmitted the message (1) to the mobile terminal MT. By storing this timestamp, $AP_{OLD}$ can determine how much time elapses between the time it transmitted the security token in the message (1) to the mobile terminal MT and the time it received a security token request in the message (3) from $AP_{NEW}$. If $AP_{OLD}$ determines that an excessive amount of time has elapsed, $AP_{OLD}$ may reject $AP_{NEW}$'S security token request. In so doing, $AP_{OLD}$ protects against "replay" attempts, that is, an intruder's attempt to use an old security token when trying to access $AP_{NEW}$.

In another alternative to the first exemplary embodiment of the present invention, $AP_{OLD}$ transmits data to the mobile terminal MT, wherein the mobile terminal MT uses that data to compute a security token, which is then transmitted to $AP_{NEW}$ in the message (2). The $AP_{OLD}$ also transmits the data to $AP_{NEW}$, upon $AP_{NEW}$ transmitting a security token request message to $AP_{OLD}$. The $AP_{NEW}$ then computes the security token and compares it with the security token received from the mobile terminal MT in message (2). Again, if the security tokens match, $AP_{NEW}$ authenticates the mobile terminal MT, thereby paving the way for a communication link to be established between the mobile terminal MT and $AP_{NEW}$.

Figure 3:
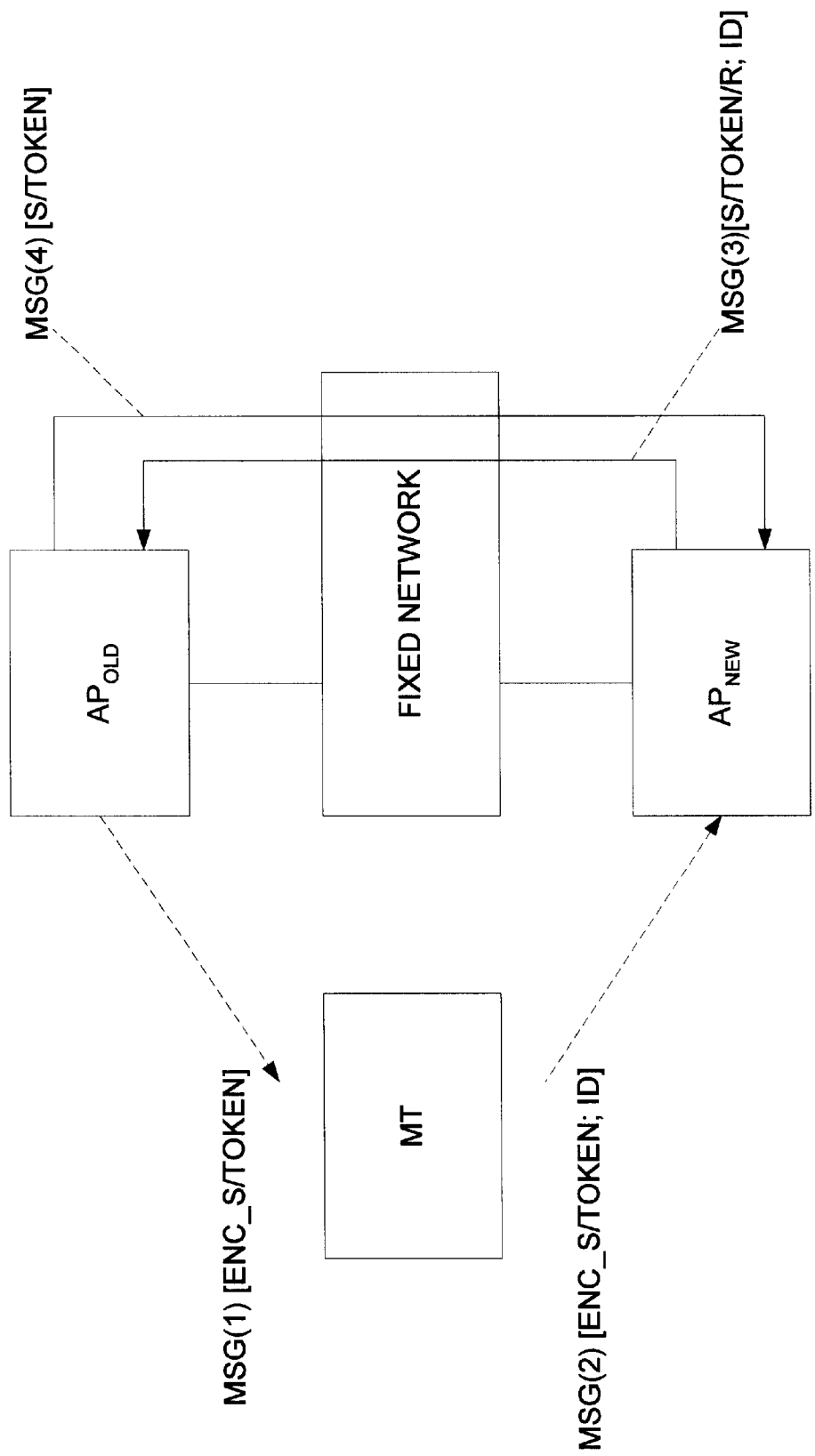
FIG. 3 illustrates a second embodiment of the present invention.

FIG. 3 illustrates a technique to secure communications for a mobile terminal MT during a handover procedure from one access point (e.g., $AP_{OLD}$) to a second access point (e.g., $AP_{NEW}$), in accordance with a second exemplary embodiment of the present invention. As shown in FIG. 3, the technique associated with this second exemplary embodiment is similar to the technique associated with the first exemplary embodiment, but for the fact that the security token transmitted from $AP_{OLD}$ to the mobile terminal MT in message (1), and thereafter, transmitted from the mobile terminal MT to $AP_{NEW}$ in message (2) is encrypted, as indicated by the notation ENC_S/TOKEN. Accordingly, $AP_{NEW}$ must obtain the correct encryption key to decipher the security token. The $AP_{NEW}$ may obtain the encryption key, for example, by accessing a common key database or through transference from $AP_{OLD}$. It will be understood that the mobile terminal MT need not maintain that encryption key, as it merely receives the encrypted security token from $AP_{OLD}$ and then passes it on to $AP_{NEW}$. Moreover, it will be understood that in order to further protect communications, the encryption key may periodically change.

Further in accordance with the second exemplary embodiment, $AP_{NEW}$ then transmits a message (3) containing a security token request to $AP_{OLD}$, through the fixed network. Assuming the time associated with any timestamp has not elapsed, $AP_{OLD}$ then transmits a message (4) containing an un-encrypted version of the security token to $AP_{NEW}$. Because the message (4) is routed through the fixed network and not over the radio interface, the security token contained therein is not encrypted. The $AP_{NEW}$ can now compare the security token received in message (4) with the security token received in message (2), which it subsequently deciphered. Once again, if $AP_{NEW}$ determines that the security tokens match $AP_{NEW}$ authenticates the mobile terminal MT, thereby allowing a communications link to be established between the mobile terminal MT and $AP_{NEW}$.

Figure 4:
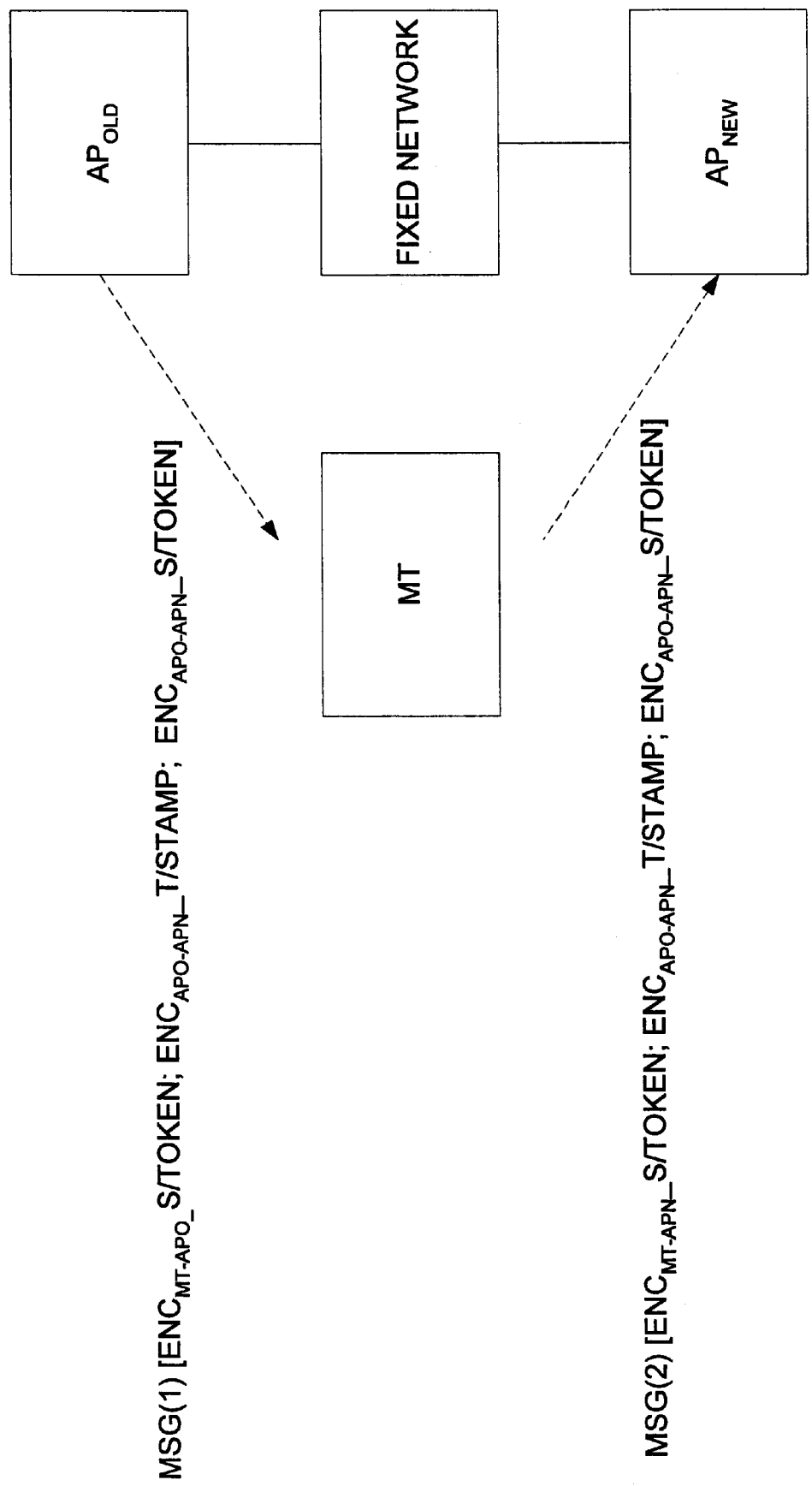
FIG. 4 illustrates a third embodiment of the present invention.

FIG. 4 illustrates a technique to secure communications for a mobile terminal during a handover procedure from a first access point (e.g., $AP_{OLD}$) to a second access point (e.g., $AP_{NEW}$), in accordance with yet a third exemplary embodiment of the present invention. In accordance with this third exemplary embodiment, a two-step process is employed, wherein all of the information needed by $AP_{NEW}$ to authenticate the mobile terminal MT, prior to the establishment of a communication link between $AP_{NEW}$ and the mobile terminal during handover, is transmitted over the radio interface.

The first step in the two-step technique associated with this third exemplary embodiment, as shown in FIG. 4, involves $AP_{OLD}$ transmitting a message (1) to the mobile terminal MT before the communications link between the mobile terminal MT and $AP_{OLD}$ is disconnected as part of the handover procedure. The message (1) contains, among other items, an encrypted security token (i.e., $ENC_{MT\text{-}APO\_}$S/TOKEN), wherein the security token is encrypted using a key that is shared only by the mobile terminal MT and $AP_{OLD}$, as indicated by the notation $ENC_{MT\text{-}APO}$. The message (1) also contains an encrypted timestamp value (i.e., $ENC_{APO\text{-}APN\_}$T/STAMP) and an encrypted hash code (i.e., $ENC_{APO\text{-}APN\_}$S/TOKEN), wherein the hash code is a function of the security token (S/TOKEN) which has been encrypted using a key that is shared only by the two access points, as indicated by the notation $ENC_{APO\text{-}APN}$.

The second step in the two-step technique associated with the third exemplary embodiment, as shown in FIG. 4, involves the mobile terminal MT processing the contents of the message (1), and thereafter transmitting a message (2) to $AP_{NEW}$, wherein processing the contents of the message (1) is primarily handled by software algorithms stored in and executed by the mobile terminal MT. More particularly, processing involves deciphering the encrypted security token using the encryption key that is shared only by the mobile terminal MT and $AP_{OLD}$, as stated above, and then re-encrypting the security token using a second encryption key that it shares only with $AP_{NEW}$. Accordingly, the message (2) contains, among other items, the re-encrypted security token (i.e., $ENC_{MT\text{-}APN\_}$S/TOKEN). As the mobile terminal MT does not possess the encryption keys to decipher the timestamp value and the hash code contained in the message (1), the mobile terminal MT merely transfers these to the message (2) for use by $AP_{NEW}$, as will be discussed in more detail below.

Upon receiving the message (2) from the mobile terminal MT, $AP_{NEW}$ deciphers each of the items contained therein using the various encryption keys. For instance, $AP_{NEW}$ deciphers the security token using the encryption key which is shares with the mobile terminal MT. The $AP_{NEW}$ then deciphers the security token from the hash code by applying the encryption key it shares with $AP_{OLD}$ The $AP_{NEW}$ can then authenticate the fact that the message (1) and the message (2) originated from a valid source, if the two security tokens match. The $AP_{NEW}$ will also decipher the timestamp value using yet another encryption key that it shares with $AP_{OLD}$, and if it is determined therefrom that an excessive amount of time has not elapsed since the $AP_{OLD}$ transmitted the message (1) to the mobile terminal MT, a communications link can be established between the mobile terminal MT and the $AP_{NEW}$, as part of the handover procedure.

Figure 5:
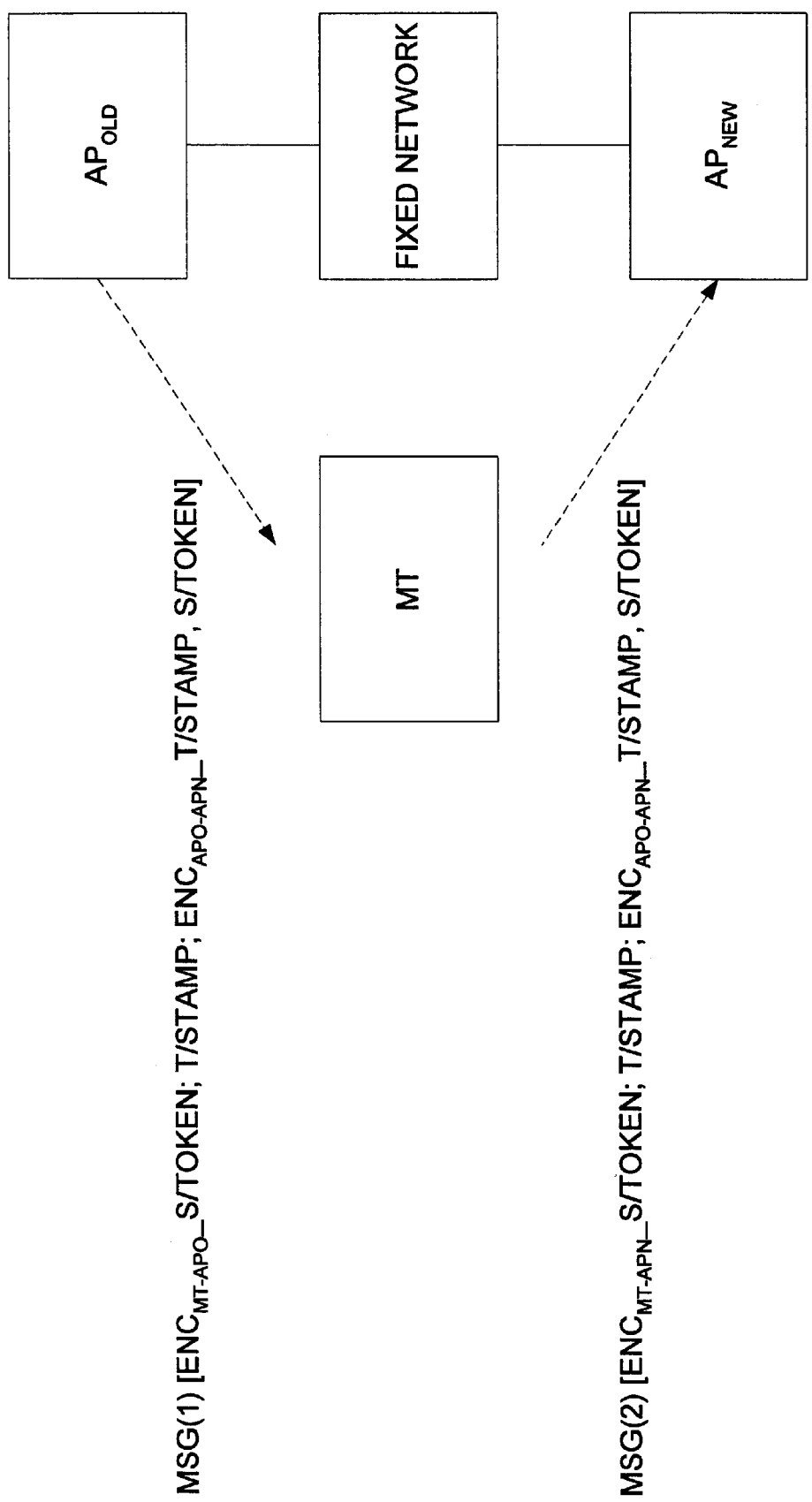
FIG. 5 illustrates a fourth embodiment of the present invention.

FIG. 5 illustrates an alternative technique, similar to that which is illustrated in FIG. 4. The alternative technique illustrated in FIG. 5 differs from the technique illustrated in FIG. 4 in that the first step in the two-step technique involves the transmission of a message (1) from $AP_{OLD}$ to the mobile terminal MT, wherein the message (1) contains a plaintext (non-encrypted) timestamp value (i.e., T/STAMP) and a hash code (i.e., $ENC_{APO-APN}$ T/STAMP, S/TOKEN), wherein the hash code is a function of the timestamp value (T/STAMP), the security token (S/TOKEN), and an encryption key that is shared only by the two access points, as indicated by the notation $ENC_{APO-APN}$. Like the technique illustrated in FIG. 4, the message (1) also contains an encrypted security token (i.e., $ENC_{MT-APO}$ S/TOKEN).

The second step of the alternative two-step technique illustrated in FIG. 5, like the technique illustrated in FIG. 4, involves the mobile terminal processing the contents of the message (1), and thereafter transmitting a message (2) to $AP_{NEW}$, wherein the processing of the contents of the message (1) involves deciphering the encrypted security token using the encryption key that is shared only by the mobile terminal MT and $AP_{OLD}$, and then re-encrypting the security token using a second encryption key that the mobile terminal MT shares only with $AP_{NEW}$. The re-encrypted security token (i.e., $ENC_{MT-APN}$ S/TOKEN) is then inserted into the message (2) along with the plaintext timestamp value and the hash code. The message (2) is then transmitted to $AP_{NEW}$.

After receiving the message (2) from the mobile terminal MT, $AP_{NEW}$ deciphers the contents of the message (2) using the various encryption keys. For example, $AP_{NEW}$ deciphers the security token using the encryption key which it shares with the mobile terminal MT. The $AP_{NEW}$ then deciphers the security token and the timestamp value from the hash code by applying the encryption key it shares with $AP_{OLD}$. The $AP_{NEW}$ can then authenticate the fact that message (1) and message (2) originated from a valid source, if the two security tokens match and/or the two timestamp values match. If $AP_{NEW}$ determines, based on the timestamp value, that an excessive amount of time has not elapsed since $AP_{OLD}$ transmitted the message (1) to the mobile terminal MT, a communications link can be established between the mobile terminal MT and the $AP_{NEW}$, as part of the handover procedure.

The present invention has been described with reference to several exemplary embodiments. However, it will be readily apparent to those skilled in the art that it is possible to embody the invention in specific forms other than those specifically described herein above; furthermore, this may be done without departing from the spirit of the invention. These embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. In a mobile, wireless telecommunications network, a method for achieving secure handover of a mobile terminal from a first access point to a second access point, wherein the first access point and the second access point are physically connected through a fixed network, said method comprising the steps of:

transmitting a security token from the first access point to the mobile terminal over a radio interface;

transmitting the security token from the mobile terminal to the second access point over the radio interface;

transmitting the security token from the first access point to the second access point through the fixed network; and establishing a communications link between the mobile terminal and the second access point, to achieve secure handover, if the second access point determines that the security token received from the mobile terminal matches the security token received from the first access point.

2. The method of claim 1, wherein the security token is encrypted at the first access point.

3. The method of claim 2 further comprising the step of:

at the second access point, obtaining an encryption key from the first access point to decipher the encrypted security token.

4. The method of claim 2 further comprising the step of:

at the second access point, obtaining an encryption key from a common key database to decipher the encrypted security token.

5. The method of claim 1 further comprising the steps of:

transmitting a mobile terminal identification code, along with the security token, from the mobile terminal to the second access point; and transmitting a security token request and the mobile terminal identification code from the second access point to the first access point, through the fixed network.

6. In a mobile, wireless telecommunications network, a method for achieving secure handover of a mobile terminal from a first access point to a second access point, said method comprising the steps of:

transmitting a first message from the first access point to the mobile terminal over a radio interface, wherein the first message contains an encrypted security token and a hash code;

in the mobile terminal, deciphering the encrypted security token using an encryption key shared by the mobile terminal and the first access point;

in the mobile terminal, re-encrypting the security token using an encryption key that is shared by the mobile terminal and the second access point;

transmitting a second message from the mobile terminal to the second access point, wherein the second message contains the re-encrypted security token and the hash code;

deciphering the re-encrypted security token at the second access point using the encryption key shared by the mobile terminal and the second access point; and establishing a communications link between the mobile terminal and the second access point, to achieve secure handover, if the second access point authenticates the mobile terminal based on the deciphered security token and the hash code.

7. The method of claim 6, wherein the hash code is a function of the security token and an encryption key that is shared by the first access point and the second access point.

8. The method of claim 7 further comprising the steps of:

deciphering the security token at the second access point by applying the encryption key shared by the first access point and the second access point to the hash code;

comparing the security token deciphered using the encryption key shared by the mobile terminal and the second access point with the security token deciphered using the encryption key shared by the first access point and the second access point; and authenticating the mobile terminal if the second access point determines that there is a match between the security token deciphered using the encryption key shared by the mobile terminal and the second access point and the security token deciphered using the encryption key shared by the first access point and the second access point.

9. The method of claim 7, wherein the hash code is also a function of a timestamp value.

10. The method of claim 6, wherein the first message and the second message each contain a timestamp value.

11. The method of claim 10 further comprising the step of:
determining, as a function of the timestamp value, whether an excessive period of time elapsed between the time the first message was transmitted from the first access point to the mobile terminal and the time the second message was received by the second access point.

12. The method of claim 11 further comprising the step of:
preventing the establishment of a communications link between the mobile terminal and the second access point, if it is determined that an excessive amount of time has elapsed.

13. The method of claim 11 further comprising the step of:
encrypting the timestamp value using an encryption key that is shared by the first access point and the second access point.

14. In a mobile, wireless telecommunications network, a method for achieving secure handover of a mobile terminal from a first access point to a second access point, wherein the first access point and the second access point are physically connected through a fixed network, said method comprising the steps of:
transmitting a security token from the first access point to the mobile terminal over a radio interface;
transmitting the security token from the mobile terminal to the second access point over the radio interface;
transmitting the security token from the first access point to the second access point through the fixed network; and
establishing a communications link between the mobile terminal and the second access point, to achieve secure handover, if the second access point determines that the security token received from the mobile terminal matches the security token received from the first access point.

15. The method of claim 14, wherein the security token is encrypted at the first access point.

16. The method of claim 15 further comprising the step of:
at the second access point, obtaining an encryption key from the first access point to decipher the encrypted security token.

17. The method of claim 15 further comprising the step of:
at the second access point, obtaining an encryption key from a common key database to decipher the encrypted security token.

18. The method of claim 14 further comprising the steps of:
transmitting a mobile terminal identification code, along with the security token, from the mobile terminal to the second access point; and
transmitting a security token request and the mobile terminal identification code from the second access point to the first access point, through the fixed network.

19. In a mobile, wireless telecommunications network, a method for achieving secure handover of a mobile terminal from a first access point to a second access point, said method comprising the steps of:
transmitting a first message from the first access point to the mobile terminal over a radio interface, wherein the first message contains an encrypted security token and a hash code;
in the mobile terminal, deciphering the encrypted security token using an encryption key shared by the mobile terminal and the first access point;
in the mobile terminal, re-encrypting the security token using an encryption key that is shared by the mobile terminal and the second access point;
transmitting a second message from the mobile terminal to the second access point, wherein the second message contains the re-encrypted security token and the hash code;
deciphering the re-encrypted security token at the second access point using the encryption key shared by the mobile terminal and the second access point; and
establishing a communications link between the mobile terminal and the second access point, to achieve secure handover, if the second access point authenticates the mobile terminal based on the deciphered security token and the hash code.

20. The method of claim 19, wherein the hash code is a function of the security token and an encryption key that is shared by the first access point and the second access point.

21. The method of claim 20 further comprising the steps of:
deciphering the security token at the second access point by applying the encryption key shared by the first access point and the second access point to the hash code;
comparing the security token deciphered using the encryption key shared by the mobile terminal and the second access point with the security token deciphered using the encryption key shared by the first access point and the second access point; and
authenticating the mobile terminal if the second access point determines that there is a match between the security token deciphered using the encryption key shared by the mobile terminal and the second access point and the security token deciphered using the encryption key shared by the first access point and the second access point.

22. The method of claim 20, wherein the hash code is also a function of a timestamp value.

23. The method of claim 19, wherein the first message and the second message each contain a timestamp value.

24. The method of claim 23 further comprising the step of:
determining, as a function of the timestamp value, whether an excessive period of time elapsed between the time the first message was transmitted from the first access point to the mobile terminal and the time the second message was received by the second access point.

25. The method of claim 24 further comprising the step of:
preventing the establishment of a communications link between the mobile terminal and the second access point, if it is determined that an excessive amount of time has elapsed.

26. The method of claim 24 further comprising the step of:
encrypting the timestamp value using an encryption key that is shared by the first access point and the second access point.

* * * * *